United States Patent [19]

Seino

[11] Patent Number: 5,046,821

[45] Date of Patent: Sep. 10, 1991

[54] OPTICS SUPPORT FOR AN OPTICAL DISK DRIVE

[75] Inventor: Masaaki Seino, Tokyo, Japan

[73] Assignee: NEC Corporation, Tokyo, Japan

[21] Appl. No.: 430,834

[22] Filed: Oct. 31, 1989

[30] Foreign Application Priority Data

Nov. 2, 1988 [JP] Japan .................................. 63-278886
Mar. 2, 1989 [JP] Japan ..................................... 1-51149

[51] Int. Cl.$^5$ ............................ G02B 7/02; G11B 7/00
[52] U.S. Cl. .................................. 359/823; 369/44.16; 359/813
[58] Field of Search .............. 369/44, 45, 44.15–44.19; 360/105, 133, 99.04, 99.01, 122; 350/247–257

[56] References Cited

U.S. PATENT DOCUMENTS

| 4,720,088 | 1/1988 | Tamura | 350/247 |
| 4,752,117 | 6/1988 | Ichikawa et al. | 350/255 |
| 4,759,005 | 7/1988 | Kasahara | 369/44.16 |
| 4,794,580 | 12/1988 | Ikedo et al. | 350/252 |
| 4,798,447 | 1/1989 | Jansen et al. | 350/255 |
| 4,813,033 | 3/1989 | Baasch et al. | 350/247 |
| 4,818,066 | 4/1989 | Nose | 350/247 |
| 4,878,214 | 10/1989 | Hinotani | 350/247 |

FOREIGN PATENT DOCUMENTS

| 59-104733 | 6/1984 | Japan . | |
| 60-136925 | 7/1985 | Japan | 369/44.16 |
| 61-48142 | 3/1986 | Japan . | |
| 61-220141 | 9/1986 | Japan | 369/44.15 |
| 61-230638 | 10/1986 | Japan | 369/44.15 |
| 62-92143 | 4/1987 | Japan | 369/44.16 |

Primary Examiner—Bruce Y. Arnold
Assistant Examiner—Thong Nguyen
Attorney, Agent, or Firm—Sughrue, Mion, Zinn, Macpeak & Seas

[57] ABSTRACT

An optics support for an optical disk drive which records and reproduces optical data out of the recording surface of an optical disk through optics which includes an objective lens. The optics is supported by resilient support members which are individually assigned to a focusing and a tracking direction, so that the objective lens is movable in the two different directions relative to the recording surface of a disk. The support members assigned to the focusing direction each has a substrate configured as a thin leaf spring and a film of resin which hardened when illuminated by ultraviolet rays and is provided on one surface of the substrate. The support member assigned to the tracking direction is made up of a metal substrate having two aligned slots at the intermediate thereof, sublaminates provided on opposite surfaces of the substrate to play the role of vibration-suppressing members, and metal plates provided on the outer surfaces of the sublaminates and each having a slot at the intermediate thereof. Each sublaminate has a plate made of hard resin, and layers made of soft resin and deposited on opposite surfaces of the plate.

15 Claims, 6 Drawing Sheets

OPTICS SUPPORT FOR AN OPTICAL DISK DRIVE

BACKGROUND OF THE INVENTION

The present invention relates to an optical disk drive having optics which includes an objective lens for recording and reproducing optical data out of an optical disk and, more particularly, to an optics support for an optical disk drive which allows an objective optical lens to move in a focusing and a tracking direction relative to the recording surface of a disk.

Today, a video disk drive, digital audio disk drive, optical filing system or similar optical disk drive is extensively used for recording and reproducing optical data out of an optical information recording medium, or disk. Specifically, pits representative of data are formed in an optical disk in a spiral track configuration. To playback the disk, while the disk is rotated at a predetermined speed, the track on the disk is illuminated by a spot beam so that a variation in the intensity of the resulting reflected or transmitted light is converted into an electric signal representative of the original data. A prerequisite with the playback is that the spot beam be accurately focused onto the recording surface of a disk. Therefore, the optics have to be supported such that an objective lens therefore is movable in a focusing direction which is perpendicular to the recording surface of a disk, i.e., along the axis of the objective lens. The optics also have to be supported in such a manner as to allow the objective lens to move along the radius of a disk, i.e., in a tracking direction, so that the spot beam may accurately track the disk at all times. To meet these requirements, optics with an objective lens are generally supported by a device which is made up of a support mechanism for supporting the optics while allowing it to move in the focusing and tracking directions, and a drive mechanism for driving the optics in the two different directions in response to a focusing error signal and a tracking error signal. This type of optics support arrangement is disclosed in Japanese Patent Laid-Open Publication (Kokai) Nos. 59-104733 and 61-48142 and U.S. Pat. No. 4,759,005 (Kasahara), for example.

The support mechanism mentioned above has customarily been implemented by a pair of thin leaf springs each being deformable in a different direction, i.e., in the focusing or the tracking direction. These leaf springs, or resilient members, support the objective lens of the optics such that the lens is movable. The drive mechanism associated with the support mechanism has a first and a second drive coil for displacing the lens in the focusing direction and the tracking direction, respectively. When currents individually associated with the focusing error and tracking error signals are applied to the independent drive coils, the leaf springs are deformed to displace the lens in their predetermined directions. The position of the lens is finely adjusted in this way by the deformation of the leaf springs in the focusing and tracking directions as effected by the drive mechanism.

A problem with the above described type of drive mechanism is that the leaf springs are apt to undergo resonance during operation. For example, assume that the objective lens is displaced in the tracking direction. Then, the lens is displaced in the focusing direction also, so that a twisting force and, therefore, resonance occur due to the deviation between the point where the resulting force acts and the point where the leaf spring exerts a reaction. To eliminate the resonance and thereby enhance the damping characteristic, each of the leaf springs has heretofore been provided with a laminate structure made up of a sheet-like resilient member, and vibration-preventing or -suppressing members provided on opposite sides of the resilient member and made of butyl rubber or silicon rubber, for example. However, a satisfactory vibration-suppressing effect is not achievable with the leaf springs unless their vibration-suppressing members have adequate hardness and are about 0.05 millimeters to 0.3 millimeters thick. This, coupled with the fact that such vibration-suppressing members have to be adhered or otherwise connected to opposite sides of the elastic member, renders the production line complicated. With an adhesive, for example, it is not easy to accomplish a desired vibration-suppressing effect because applying it uniformly is difficult. Further, the assembly of the leaf springs of the support mechanism involves a substantial degree of scattering, also aggravating the damping characteristic.

SUMMARY OF THE INVENTION

It is therefore an object of the present invention to provide an optics support for an optical disk drive which supports optics while allowing its objective lens to move in the focusing and tracking directions relative to the recording surface of an optical disk.

It is another object of the present invention to provide an optics support for an optical disk drive which eliminates the resonance of resilient support members included in a support mechanism that supports and moves an objective lens of optics in the focusing and tracking directions.

It is another object of the present invention to provide a generally improved optics support for an optical disk drive.

In accordance with the present invention, there is provided in an optical system supporting device for supporting an optical system of an optical disk drive such that an objective lens forming a part of the optical system is movable in a tracking direction relative to a recording surface of an optical disk, a single thin leaf spring resilient structure which constitutes a part of the optical system supporting device and comprises a metal substrate configured as a thin leaf spring, first layers of soft resin provided on opposite major surfaces of the substrate, plates of hard resin provided on outer surfaces of the first layers, and second layers of soft resin provided on outer surfaces of the plates of hard resin.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
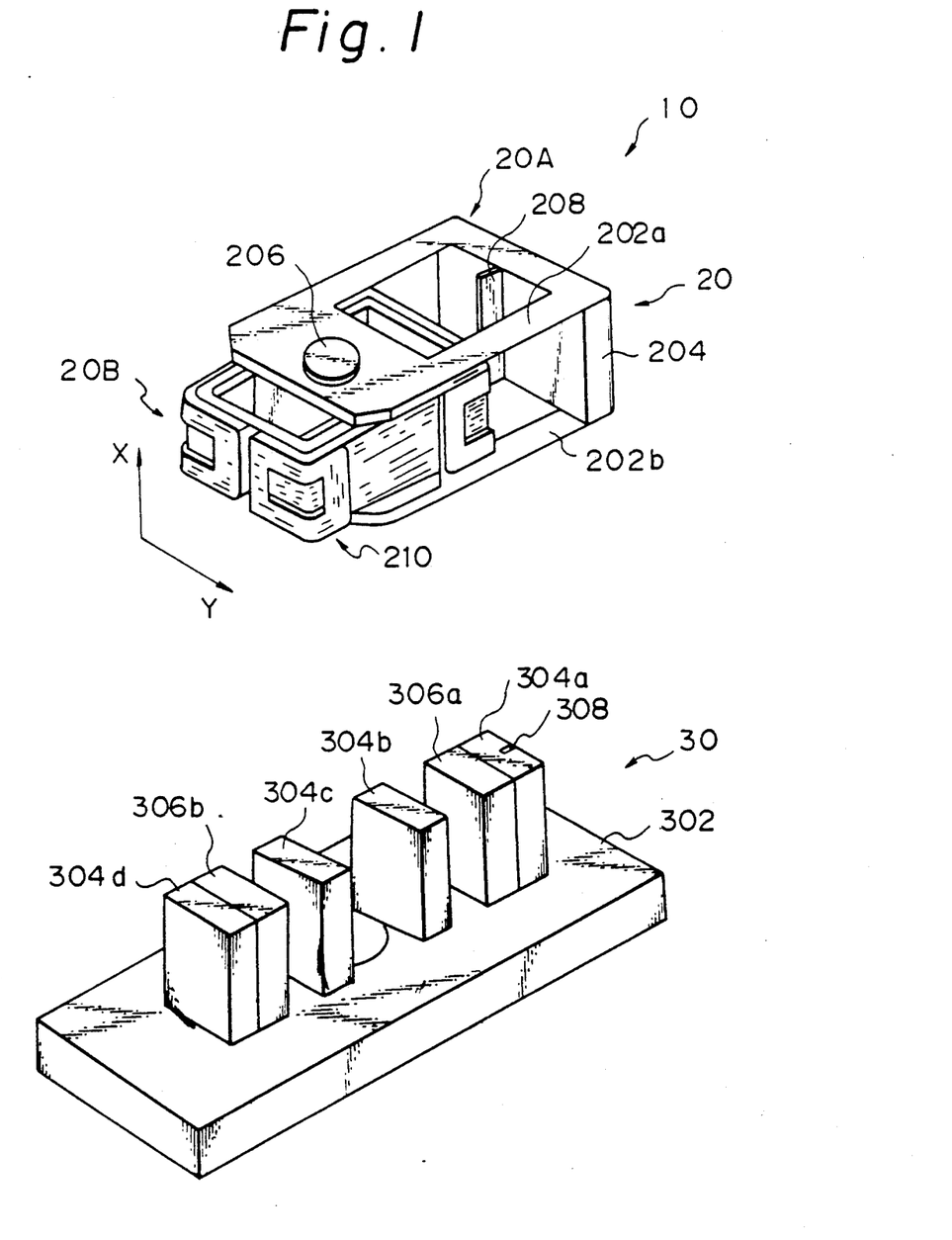
FIG. 1 is an exploded perspective view of an optics support for an optical disk drive embodying the present invention.

Referring to FIG. 1 of the drawings, an optics support for an optical disk drive embodying the present invention is shown and generally designated by the reference numeral 10. As shown, the optics support 10 is generally made up of a movable subassembly 20 and a stationary subassembly 30 to which the subassembly 20 is mounted. The movable subassembly 20 has a support mechanism 20A and a drive mechanism 20B. The support mechanism 20A supports optics such that the latter are movable in the focusing and tracking directions relative to the recording surface of an optical disk, not shown. The drive mechanism 20B drives the optics in the focusing and tracking directions in response to a focusing error signal and a tracking error signal, respectively, which are fed thereto from a controller, not shown. The support mechanism 20A is constituted by a pair of flat resilient support members 202a and 202b which face each other, and a flat intermediate member 204 interconnecting one end of the support members 202a and 202b and having a substantial thickness. The drive mechanism 20B is held between the other end of the support members 202a and 202b. An objective lens 206 forming a part of the optics is rigidly mounted on the end of the support member 202a which overlies the drive mechanism 20B. The support members 202a and 202b are deformable in a direction indicated by an arrow X in FIG. 1, i.e., in the focusing direction relative to the recording surface of a disk. A flat elongate support member 208 also has resiliency and protrudes from the intermediate or connecting member 204 into the space which is defined by the support members 202a and 202b. The support member 208 is elongate in the focusing direction and capable of displacing the lens 206 in a direction indicated by an arrow Y in the figure, i.e. the tracking direction. One of opposite longer sides of the support member 208 is received in an elongate recess 205, FIGS. 4 and 5, which is formed in the intermediate member 204. The other longer side of the support member 208 is received in an elongate recess 308 which is formed in one yoke 304a of the stationary subassembly 30, which will be described. On the other hand, the drive mechanism 20B comprises a drive coil for driving the support members 202a and 202b and thereby the lens 206 in the focusing direction, and a drive coil for driving the support member 208 and thereby the lens 206 in the tracking direction. These drive coils are collectively designated by the reference numeral 210 and will hereinafter be referred to as a coil group. Currents individually associated with the focusing error signal and tracking error signal are applied to the coil group 210.

Figure 2:
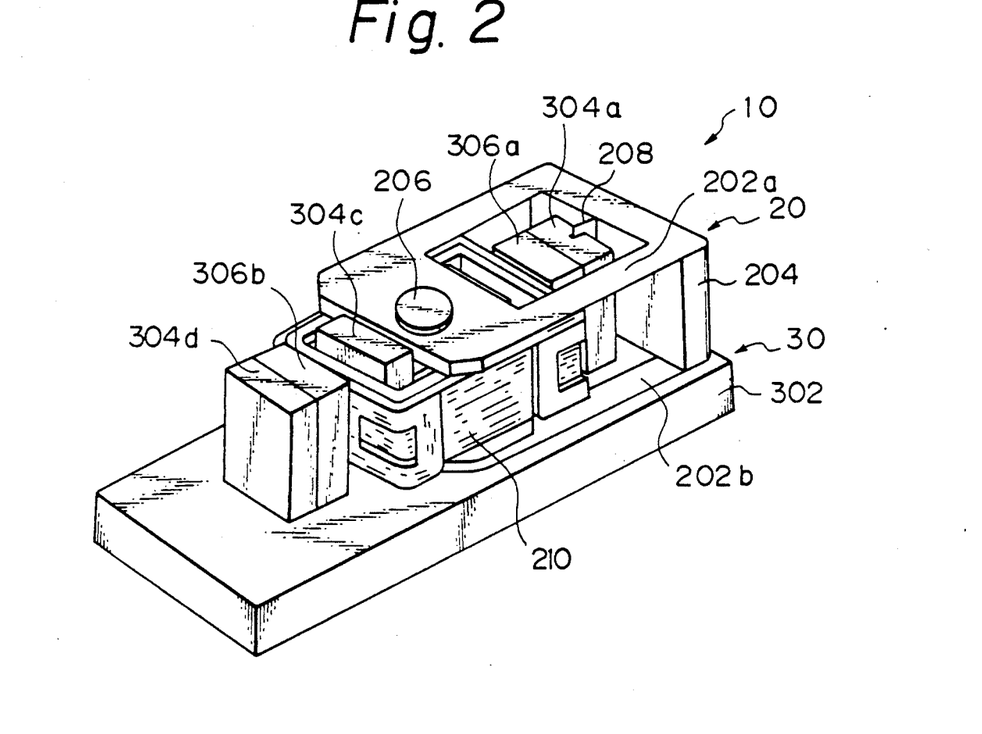
FIG. 2 is a perspective view showing the optics support of FIG. 1 in an assembled condition.

The stationary subassembly 30 has a base member 302, a plurality of, four in the illustrative embodiment, yokes 304a, 304b, 304c and 304d extending from the base member 302 in a vertical position, and a plurality of, two in the illustrative embodiment, permanent magnets 306a and 306b. Among the yokes, the yoke 304a has an elongate recess 308 which extends in the focusing direction. When the movable subassembly 20 and stationary subassembly 30 are put together, the resilient support member 208 of the support mechanism 20A will be received in the recess 308. Specifically, when the two subassemblies 20 and 30 are put together as shown in FIG. 2, the coil group 210 of the subassembly 20 is positioned partly between the permanent magnet 306a and the yoke 304a of the stationary subassembly 30 and partly between the permanent magnet 306b and the yoke 304c. In this condition, magnetic circuitry is formed by the coil group 210, yokes 304a, 304b, 304c and 304d and permanent magnets 306a and 306b. The resulting electromagnetic drive forces cause the support members 202a and 202b and the support member 208 to deform in the focusing direction and the tracking direction, respectively, thereby displacing the objective lens 206.

In response to a focusing error signal or a tracking error signal, the support members 202a and 202b are deformed in the focusing direction or the support member 208 is deformed in the tracking direction, whereby the objective lens 206 is finely adjusted in position. When any of the support members 202a, 202b and 208 is deformed and then restored, undesirable resonance occurs, as well known in the art. Heretofore, such resonance has been coped with by adhering or otherwise affixing sheet members made of butyl rubber or silicon rubber to opposite sides of each resilient support member. However, such an implementation against resonance fails to offer a sufficient vibration-preventing or -suppressing effect in spite of the complicated procedure.

Hereinafter will be described the optics support of the present invention having vibration-suppressing members which accomplish a sufficient degree of anti-vibration effect.

Figure 3:
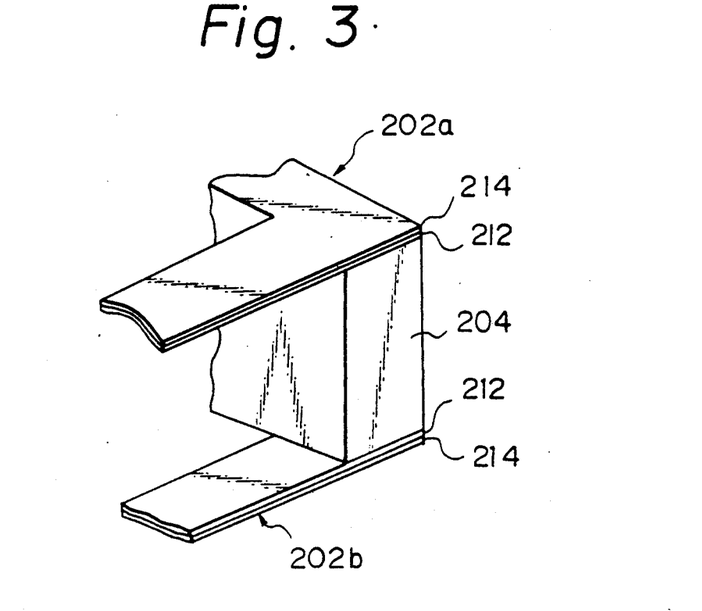
FIG. 3 is a perspective view of a pair of elastic support members for displacing in the focusing direction an objective lens which is included in a movable subassembly of FIGS. 1 and 2.

First, vibration-suppressing members will be described which eliminate the resonance of the resilient support members 202a and 202b that form a part of the support mechanism 20A of the movable subassembly 20 and displace the objective lens 206 in the focusing direction. As shown in FIG. 3, each of the support members 202a and 202b is made up of a substrate configured as a thin leaf spring 212, and a resilient member in the form of a resin film 214 provided on one surface of the substrate 212. The resin constituting the film 214 hardens when illuminated by ultraviolet rays. The resin film 214 provides the assembly with a satisfactory vibration-suppressing property. Specifically, the resin film 214 is formed before the assembly of the support mechanism 20A by dipping or spraying and then hardening it by ultraviolet rays. Preferably, the resin film 214 may be implemented by acrylic resin from the vibration suppression standpoint. In this manner, the vibration-suppressing scheme with the support members 202a and 202b is easy to accomplish.

Before entering into detailed description of vibration suppression with the support member 208 which deforms in the tracking direction, structural features of the support member 208 will be described in relation to the intermediate member 204 and yoke 304a. The support member 208 and the intermediate member 204 and yoke 304a are shown in an assembled condition in FIG. 4 and in a disassembled condition in FIG. 5. As shown in FIG.

Figure 4:
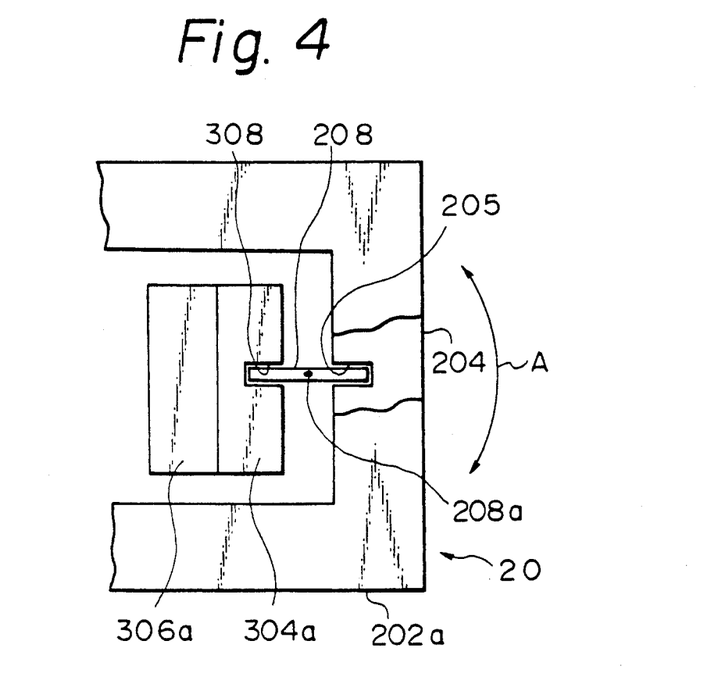
FIG. 4 is a plan view of a resilient support member for displacing the objective lens in the tracking direction, the support member being shown in an assembled position.
Figure 5:
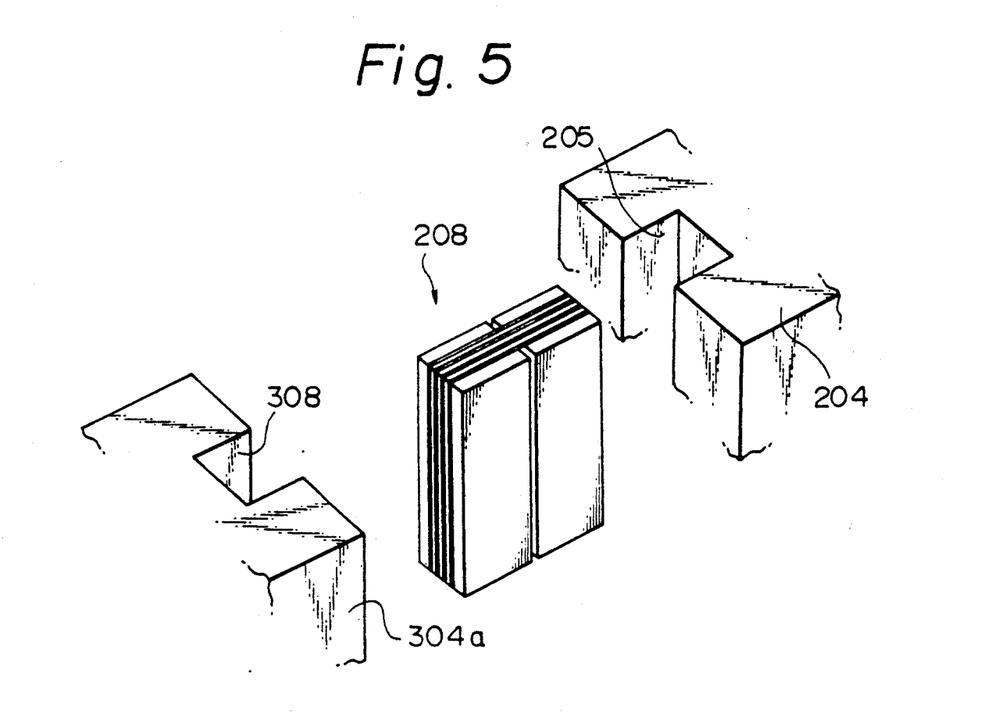
FIG. 5 is a perspective view showing the resilient support member of FIG. 4 in a disassembled condition.

4, the support member 208 is received in the elongate recesses 205 and 308 which are formed in the intermediate member 204 and yoke 304a, respectively. When a tracking error signal is applied to the coil group 210, the support member 208 deforms in either direction as indicated by an arrow A on the basis of the polarity of the signal, thereby displacing the lens 206 in the tracking direction. Ideally, the lens 206 should move in a circular motion about a fulcrum 208a. In practice, however, the lens 206 is movable not only in the tracking direction but also in the focusing direction, and hence a twisting force is generated by the deviation between the point where the force acts and the point where the reaction of the support member 208 occurs. This is the cause of the undesirable resonance.

A specific construction of the support member 208 will be described which has vibration-suppressing members capable of eliminating the resonance.

Figure 6:
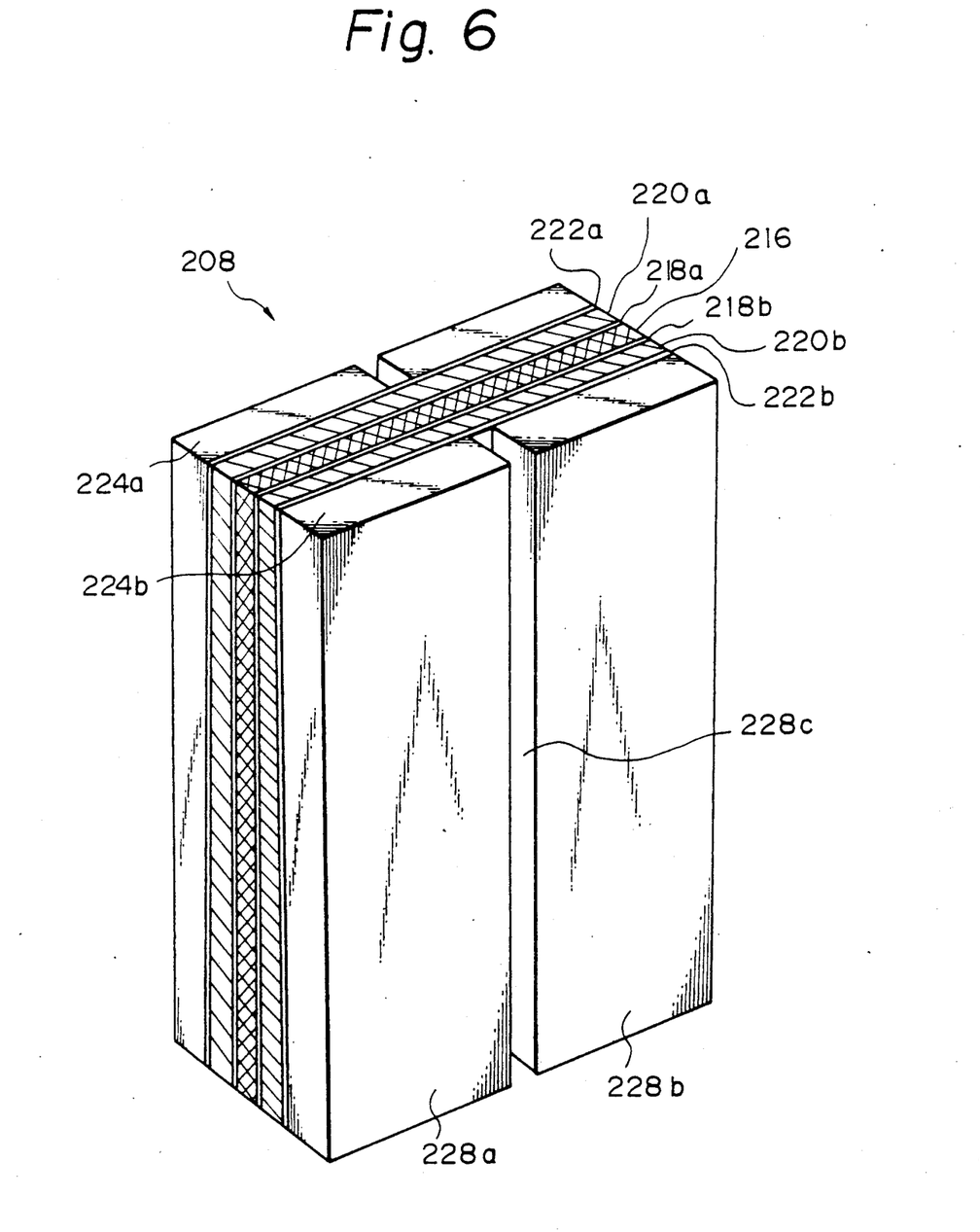
FIG. 6 is an enlarged perspective view of the resilient support member of FIG. 5.
Figure 7:
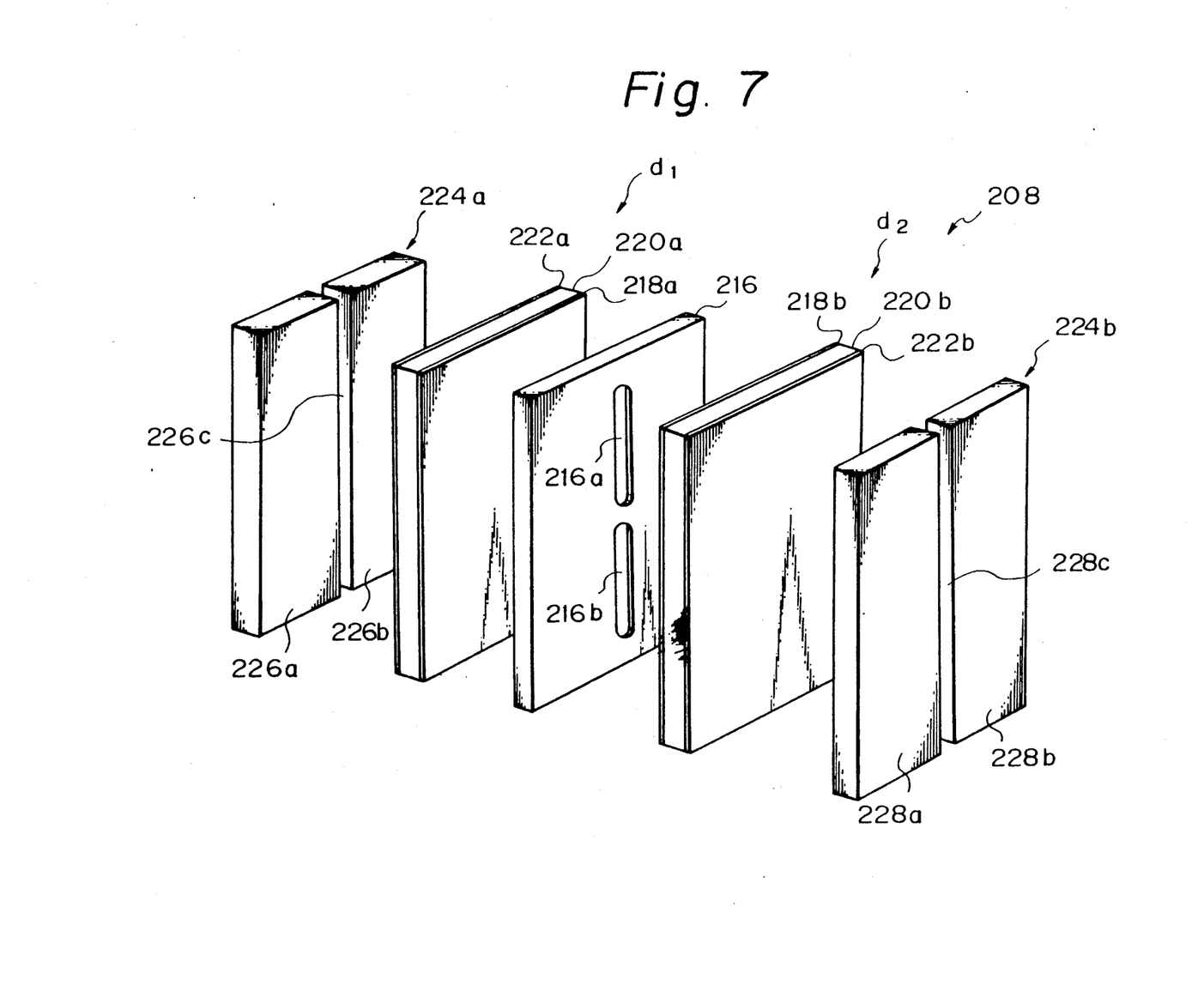
FIG. 7 is an exploded perspective view of the resilient support member of FIG. 5.

Referring to FIGS. 6 and 7, the support member 208 has a thin substrate 216 made of metal, thin layers of soft resin 218a and 218b provided on opposite surfaces of the substrate 216, plates of hard resin 220a and 220b provided respectively on the resin layers 218a and 218b, layers of soft resin 222a and 222b laminated respectively on the resin plates 220a and 220b, and plates of metal 224a and 224b provided respectively on the layers 222a and 222b and each having a substantial thickness. As indicated in FIG. 7, a sublaminate d₁ made up of the layers plate 220a and layers 218a and 222a and a sublaminate d₂ made up of the plate 220b and layers 218b and 222b have the function of suppressing the vibration of the support member 208. The substrate 216 is made of stainless steel adapted for springs and is about 0.02 millimeter to 0.05 millimeter thick while having a Young's modulus of $E=1.9\times10^4$ kilograms per square millimeter. As shown in FIG. 7, two aligned slots 216a and 216b are formed vertically through the intermediate portion of the substrate 216. The slots 216a and 216b are about 0.3 millimeter wide each and serve to adjust the spring constant of the support member 208. The layers of soft resin 218a, 218b, 222a and 222b are about 0.005 millimeter to 0.02 millimeter thick each and are implemented by an acryl-based thermoplastic material to play the role of an adhesive. The plates of hard resin 220a and 220b are comprised of polyimid films or polyester films each being about 0.05 millimeter thick and having a Young's modulus $E=3\times10^2$ kilograms per square millimeter. The metal plates 224a and 224b forming the outermost layers of the support member 208 are made of a rigid material and are about 0.3 millimeter thick each. More specifically, the metal plates 224a and 224b are respectively made up of a pair of bisected pieces 226a and 226b and a pair of bisected pieces 228a and 228b each being about 0.3 millimeter thick. The bisected pieces 226a and 226b and the bisected pieces 228a and 228b are isolated by slits 226c and 228c, respectively. The metal plates 224a and 224b retain the support member 208 and provides it with rigidity while minimizing the scattering in spring constant. In such a configuration, the slits 226c and 228c of the metal plates 224a and 224b implement the resiliency while the rest of the metal plates 224a and 224b implements the rigidity. While the slits 226c and 228c should preferably be as narrow as possible, they are provided with a width of 0.3 millimeter by photoetching in the illustrative embodiment.

The resilient support member 208 having the above structure will be fabricated as follows. A number of substrates 216 and outermost metal plates 224a and 224b are formed simultaneously by photoetching. On the other hand, two sublaminates d₁ and d₂ are prepared by coating opposite surfaces of the resin plates 220a and 220b with the resin layers 218a, 218b, 222a and 222b. Thereafter, the substrate 216, sublaminates d₁ and d₂ and outermost plates 224a and 224b are joined together. Since the hardness of the layers of soft resin 218a, 218b, 222a and 222b is extremely susceptible to temperature variations, such layers should preferably be as thin as possible. This will be accomplished if the thickness of the plates 220a and 220b is adequately selected.

In operation, when a current associated with a tracking error signal is fed to the tracking drive coil of the coil group 210 which is included in the movable subassembly 20, a bending moment acts on the support member 208 to cause the latter to deform. Then, a shearing force is developed between the substrate 216 and the adjoining plates 220a and 220b, resulting in distortions being developed in the plates 220a and 220b. This is effective to suppress the vibration. It is noteworthy that the plates 220a and 220b are adhered to the metal plates 224a and 224b through the resin layers 222a and 222b and, therefore, fixed in place with some degree of freedom, thereby insuring adequate rigidity.

Figure 8:
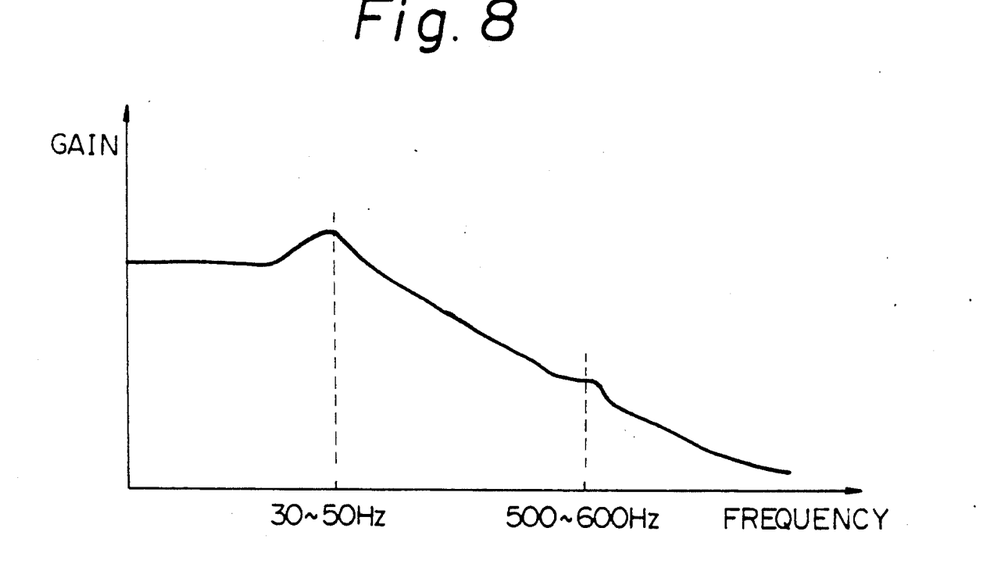
FIGS. 8 and 9 are graphs indicating respectively the resonance frequency characteristics of resilient members of the present invention and prior art.
Figure 9:
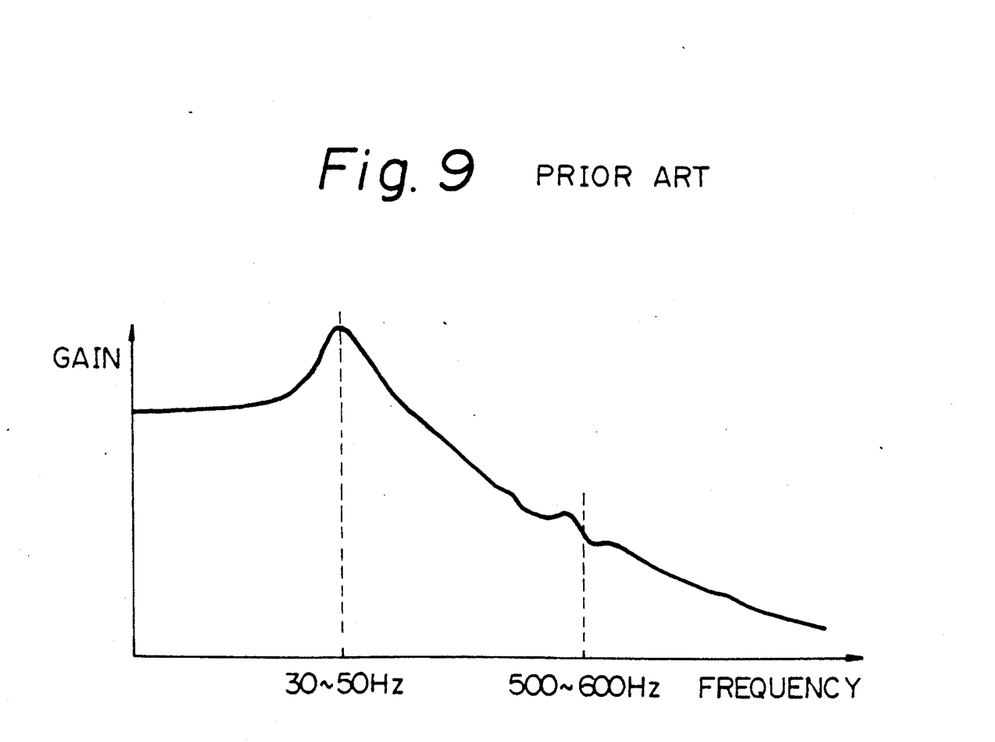

Referring to FIG. 8, a resonance frequency characteristic available with the support member 208 having the above structure is shown. As shown, the primary resonance point of the support member 208 is selected to be about 30 hertz to 50 hertz whole the torsional resonance point is selected to be about 500 hertz to 600 hertz. More specifically, the spring constant of the resilient support member 208 is so selected as to have such a frequency characteristic. In the illustrative embodiment, the peaks at the primary resonance point and torsional resonance point are designed to be as low as possible because excessively high peaks would render the control difficult. FIG. 9 shows a prior art resonance frequency characteristic; the two resonance points have high peaks at the two resonance points.

In summary, it will be seen that the present invention provides an optica support for an optical disk drive which achieves an unprecedented vibration-suppressing effect and can be fabricated by a simple and economical procedure.

Various modifications will become possible for those skilled in the art after receiving the teachings of the present disclosure without departing from the scope thereof.

What is claimed is:

1. In an optical system supporting device for supporting an optical system of an optical disk drive such that an objective lens forming a part of said optical system is movable in a tracking direction relative to a recording surface of an optical disk, a single thin leaf spring resilient structure constituting a part of said optical system supporting device, comprising:
   a metal substrate configured as a thin leaf spring;
   first layers of soft resin provided on opposite major surfaces of said substrate;
   plates of hard resin provided on outer surfaces of said first layers; and
   second layers of soft resin provided on outer surfaces of said plates of hard resin.

2. The structure as claimed in claim 1, further comprising metal plates provided on outer surfaces of said second layers.

3. The structure as claimed in claim 2, wherein each of said metal plates has a slit, in an intermediate portion thereof, extending in a focussing direction relative to the recording surface of the optical disk.

4. The structure as claimed in claim 2, wherein said metal substrate has two aligned elongate slots extending in a focussing direction relative to the recording surface of the optical disk.

5. An optical system supporting device for supporting an optical system of an optical disk drive such that an objective lens forming a part of said optical system is movable in a focussing and a tracking direction relative to a recording surface of an optical disk, comprising:

a resilient support member configured as a single thin plate for supporting the optical system, said resilient support member comprising a metal substrate configured as a thin leaf spring, first layers of soft resin provided on opposite major surfaces of said substrate, plates of hard resin provided on outer surfaces of said first layers, second layers of soft resin provided on outer surfaces of said plates of hard resin, and metal plates provided on outer surfaces of said second layers; and drive means for driving said resilient support member to displace the objective lens in the focussing and tracking directions;

said resilient support member generating a reaction against a driving force which said drive means exerts in the tracking direction.

6. A device as claimed in claim 5, further comprising a pair of second thin resilient support members positioned face-to-face for supporting the optical system, each of said second resilient support members comprising a thin substrate configured as a thin leaf spring and a film of resin provided on one of opposite major surfaces of said substrate, said second resilient support members generating a reaction in response to a driving force which said drive means exerts in the focussing direction.

7. A device for supporting an optical system of an optical disk drive such that an objective lens forming a part of said optical system is movable in a focussing and a tracking direction relative to a recording surface of an optical disk, comprising:

a pair of first thin resilient support members positioned face-to-face for supporting the optical system, each of said first resilient support members comprising a thin substrate configured as a thin leaf spring and a film of resin provided on one of opposite major surfaces of said substrate;

a second resilient support member configured as a single thin plate for supporting the optical system, said second resilient support member comprising a metal substrate configured as a thin leaf spring, first layers of soft resin provided on opposite major surfaces of said substrates, plates of hard resin provided on outer surfaces of said first layers, second layers of soft resin provided on outer surfaces of said plates of hard resin, and metal plates provided on outer surfaces of said second layers; and drive means for driving said first and second resilient support members to displace the objective lens in the focussing and tracking directions;

said first resilient support members generating a reaction in response to a driving force which said drive means exerts in the focussing direction, and said second resilient support member generating a reaction against a drive force which said drive means exerts in the tracking direction.

8. A device as claimed in claim 7, wherein said film of resin of said first resilient support members is applied to said substrate and then illuminated by ultraviolet rays so as to be hardened.

9. A device as claimed in claim 8, wherein said film on each of said first resilient support members constitutes a vibration-suppressing member of each of said first resilient support members.

10. A device as claimed in claim 7, wherein said metal substrate of said second resilient support member has two aligned elongate slots extending in the focussing direction.

11. A device as claimed in claim 10, wherein said metal substrate is made of stainless steel adapted for springs.

12. A device as claimed in claim 7, wherein said first and second layers of said second resilient support members each comprises a thermoplastic acrylic resin.

13. A device as claimed in claim 7, wherein said plates made of hard resin of said second resilient support member each comprises a polyimid film.

14. A device as claimed in claim 7, wherein said plates made of hard resin of said second resilient support member each comprises a polyester film.

15. A device as claimed in claim 7, wherein said metal plates each comprises a slit extending in the focussing direction in an intermediate portion of said metal plate.

* * * * *

UNITED STATES PATENT AND TRADEMARK OFFICE
CERTIFICATE OF CORRECTION

PATENT NO. : 5,046,821

DATED : September 10, 1991

INVENTOR(S) : Masaaki SEINO

It is certified that error appears in the above-identified patent and that said Letters Patent is hereby corrected as shown below:

Column 6:

line 30, delete "whole" and insert --while--;

line 42, delete "optica" and insert --optics--.

Signed and Sealed this

Twenty-third Day of March, 1993

Attest:

STEPHEN G. KUNIN

Attesting Officer     Acting Commissioner of Patents and Trademarks